United States Patent
Bergmiller et al.

(10) Patent No.: US 7,311,871 B2
(45) Date of Patent: Dec. 25, 2007

(54) PROCESS FOR FOAMING AROUND THE PERIPHERAL EDGE AREA OF COVER FOR A MOTOR VEHICLE ROOF AND A MOTOR VEHICLE ROOF COVER

(75) Inventors: Alexander Bergmiller, Augsburg (DE); Christian Duenzinger, Pfaffenburg (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 240 days.

(21) Appl. No.: 10/401,530

(22) Filed: Mar. 31, 2003

(65) Prior Publication Data

US 2003/0183965 A1    Oct. 2, 2003

Related U.S. Application Data

(62) Division of application No. 09/912,416, filed on Jul. 26, 2001, now Pat. No. 6,540,289.

(30) Foreign Application Priority Data

Jul. 26, 2000  (DE)  ................................ 100 36 630

(51) Int. Cl.
*B29C 70/76* (2006.01)
*B29C 33/10* (2006.01)
*B29C 45/14* (2006.01)
*B29C 45/77* (2006.01)
*B29C 45/26* (2006.01)
*B29C 45/37* (2006.01)

(52) U.S. Cl. ................................ 264/328.12; 264/46.4; 264/328.7

(58) Field of Classification Search ........... 264/328.12, 264/328.7, 45.1, 35, 46.5, 46.6; 454/129, 454/130; 296/190.1; D12/182; 428/122
See application file for complete search history.

(56) References Cited

U.S. PATENT DOCUMENTS 2,724,877 A * 11/1955 Ramsay et al.

(Continued)

FOREIGN PATENT DOCUMENTS

DE    1 945 291    5/1971

OTHER PUBLICATIONS

VDI-Verlag GMBH, Kunststofftechnik, Werkzeuge Für Die Pur-Verarbeitung, Verein Deutscher Ingenieure, Verlag Des Vereins Deutscher Ingenieure, Düsseldorf, pp. 96-99.

(Continued)

Primary Examiner—Christina Johnson
Assistant Examiner—Matthew J. Daniels
(74) Attorney, Agent, or Firm—David S. Safran

(57) ABSTRACT

A process for foaming around a peripheral edge area of a cover (10) for a motor vehicle roof, the cover being placed on or in a foaming tool and the foam mass (18) being fed into the foaming tool such that two foam mass fronts are formed which run around the peripheral edge in the peripheral direction and merge with one another or meet one another in the merging area at a side opposite that at which the foam was introduced. The foaming tool is made such that, in the merging area, the cross section of the foam mass is reduced on the side opposite the ventilation side (40) of the foaming tool that is vented relative to the areas (42, 142) which border the merging area in order to prevent inclusion of gas bubbles in the merging area. Furthermore, a cover for a motor vehicle roof is produced which has a foamed peripheral edge area in which two foam mass fronts, which are formed during the peripheral foaming in a foaming tool, merge with one another. In the merging area, the cross section of the foam mass on the side opposite the ventilation side of the foaming tool is reduced relative to the areas which border the merging area.

15 Claims, 4 Drawing Sheets

U.S. PATENT DOCUMENTS

| | | | | |
|---|---|---|---|---|
| 4,291,912 A | * | 9/1981 | Fox et al. | 296/217 |
| 4,399,093 A | * | 8/1983 | Kirby et al. | 264/328.2 |
| 5,050,928 A | | 9/1991 | Böhm et al. | |
| 5,294,385 A | * | 3/1994 | Hirota | 264/45.1 |
| 5,435,384 A | * | 7/1995 | Wu | 165/185 |
| 5,466,508 A | * | 11/1995 | Brocke et al. | 428/122 |
| 5,473,840 A | * | 12/1995 | Gillen et al. | 49/380 |
| 5,580,628 A | * | 12/1996 | Cordes et al. | 428/38 |
| 5,833,913 A | * | 11/1998 | Ellwood et al. | 264/328.7 |
| 5,865,443 A | * | 2/1999 | Abe | 277/448 |
| 6,283,542 B1 | | 9/2001 | Pàtz | |
| 6,375,254 B1 | | 4/2002 | Pàtz | |

OTHER PUBLICATIONS

VDI-Verlag GMBH, Kunststofftechnik, Werkzeuge Für Die Pur-Verarbeitung, Verein Deutscher Ingenieure, Verlag Des Vereins Deutscher Ingenieure, Düsseldorf, pp. 96-99, 1984.

* cited by examiner

PROCESS FOR FOAMING AROUND THE PERIPHERAL EDGE AREA OF COVER FOR A MOTOR VEHICLE ROOF AND A MOTOR VEHICLE ROOF COVER

BACKGROUND OF THE INVENTION

1. Field of the Invention

This invention relates to a process for foaming around the peripheral edge area of a cover, especially a glass cover, for a motor vehicle roof, the cover being placed on or in a foaming tool and the foam mass being fed into the foaming tool such that two foam mass fronts are formed which run towards one another in the peripheral direction and merge with one another or meet one another in a merging area. The invention furthermore relates to a cover for a motor vehicle roof in which two foam mass fronts which are formed during the peripheral foaming in the foaming tool merge with one another in the merging area.

2. Description of Related Art

FIGS. 1 & 2 schematically show a cover for a motor vehicle roof during or after peripheral foaming by means of a conventionally used process. The cover 10 is placed in a foaming tool in order to foam a carrier element 16, which is usually called the "inside cover sheet," to the bottom of the cover 10 and to provide for a peripherally foamed edge area 18. In doing so, the foam mass, conventionally PUR, is added to the foaming tool from the sprue side 20, resulting in the formation of two foam mass fronts 22 in the peripheral direction of the cover 10, which fronts move towards one another in the peripheral direction of the cover and meet in an area 24 which is hereinafter called the merging area. Since ventilation takes place away from the peripheral area of the cover in the direction of the arrow 26, in the form of the front 22 shown, i.e., when the flow rate on the ventilation side 26 of the foaming tool is greater than on the opposite boundary edge, there is the danger that, in the merging area, on the boundary edge of the foam mass facing away from the ventilation side 26, air inclusions in the form of bubbles will occur. This area which is subject to bubble formation is labeled with reference number 30 in FIG. 2, which shows a section along the line II-II in FIG. 1. These air inclusions cause a high scrap rate.

SUMMARY OF THE INVENTION

The primary object of this invention is to devise a process for foaming around the cover for a motor vehicle roof in which formation of bubbles due to air inclusions is prevented.

Furthermore, it is also an object to form a motor vehicle roof cover with an at least largely bubble-free foaming around the edge.

This object is achieved as claimed in the invention by a process in which the foaming tool is made such that, in the merging area, the foaming cross section on the side opposite the ventilation side of the foaming tool is reduced relative to the areas which border the merging area in order to prevent inclusion of gas bubbles in the merging area, and by a cover in which the cross section of the foam mass on the side opposite the ventilation side of the foaming tool is reduced relative to the areas which border the merging area. In this approach in accordance with the invention, it is advantageous that, especially by the corresponding configuration of the foaming tool, the probability of enclosure of gas bubbles in the foam mass in the merging area being pushed more towards the ventilation side of the foaming tool than in the areas adjoining the merging area.

Advantageous embodiments of the invention are explained in detail below by way of example with reference to the accompanying drawings.

DETAILED DESCRIPTION OF THE INVENTION

Figure 1:
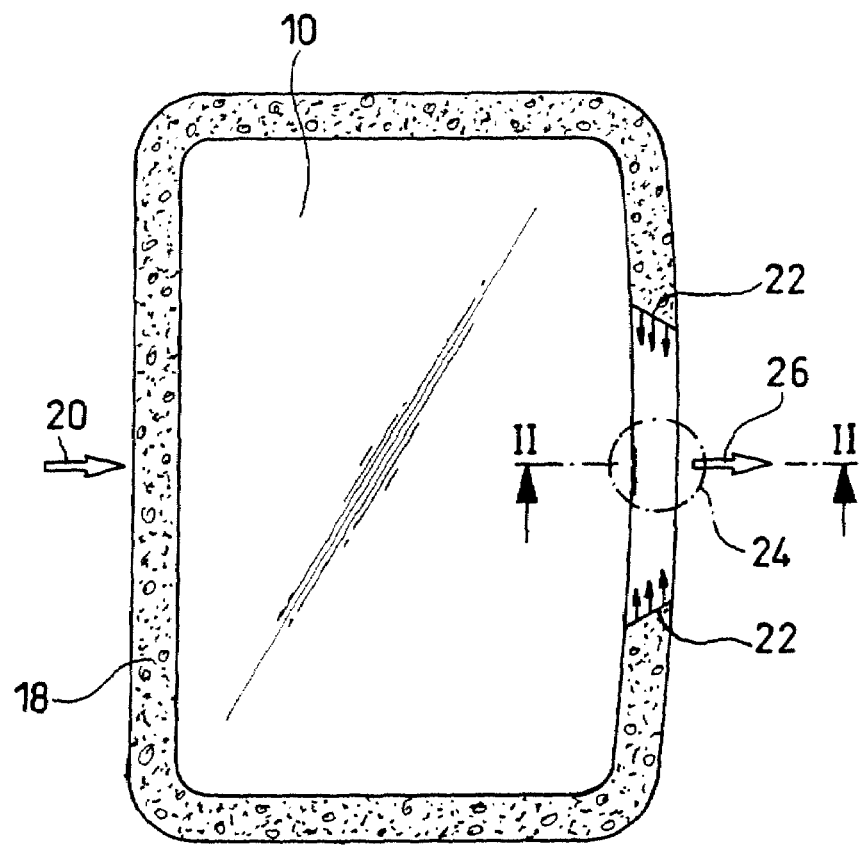
FIG. 1 schematically shows a prior art peripheral foaming process.
Figure 3:
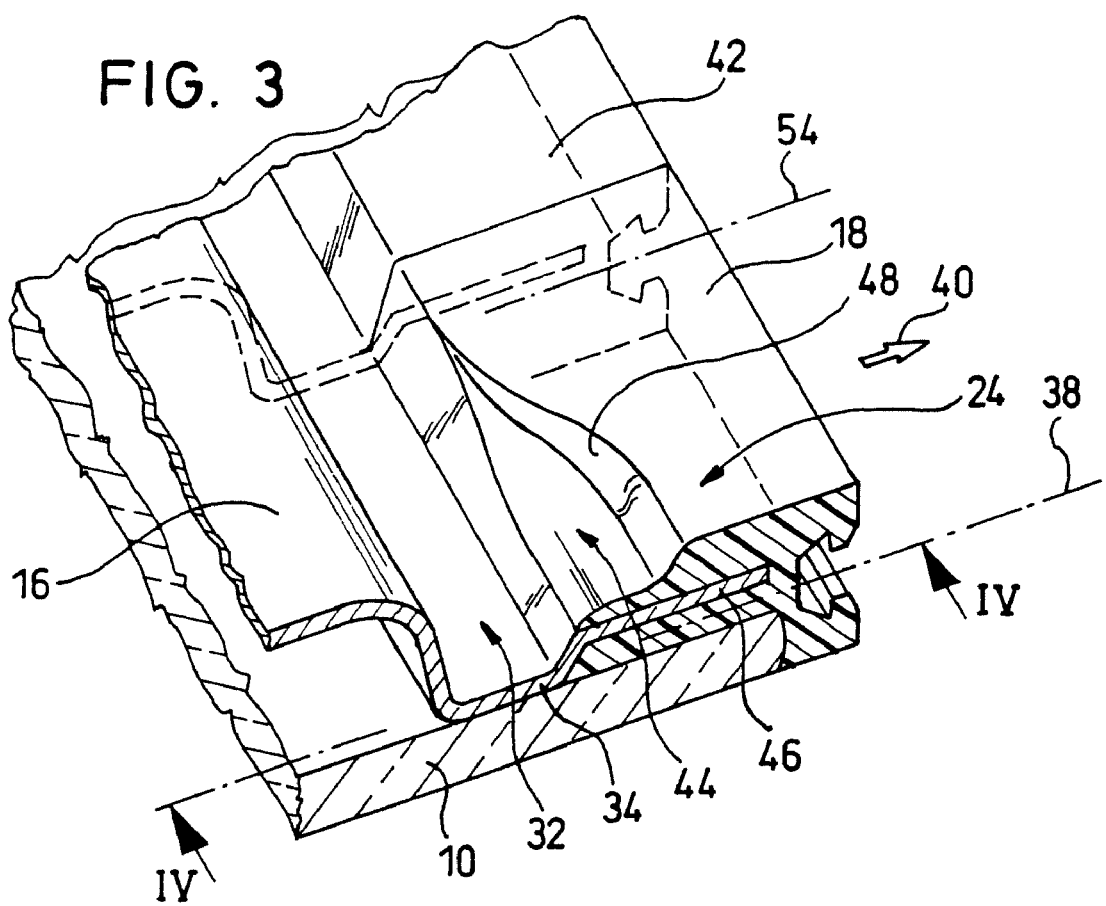
FIG. 3 is a cross-sectional perspective view of a peripheral portion of a cover produced with the first embodiment of the process according to the invention, with the underside of the cover facing upward.
Figure 4:
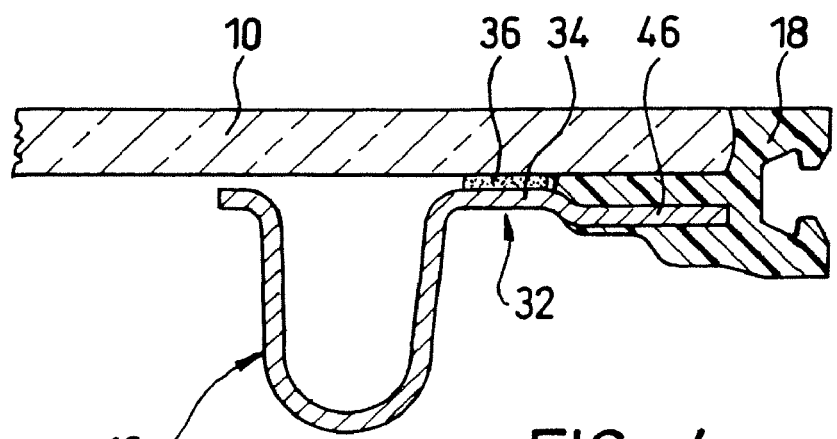
FIG. 4 is a section taken along line IV-IV in FIG. 3, the view being turned by 180° with reference to FIG. 3.

Basically, foaming around a cover 10 in accordance with the invention takes place as follows: as in FIG. 1, the cover 10 is placed in or on a foaming tool (not shown) and the foam mass 18, preferably PUR, is fed into the foaming tool such that two foam mass fronts are formed which run towards one another in the peripheral direction and merge with one another or meet one another in the merging area 24. On the bottom of the cover 10, which is formed preferably by a glass pane, as shown in FIGS. 3 & 4, there is an inside cover sheet 16 which is made as a profile section and which has a bead 32 which runs in the peripheral direction, with a base 34 which adjoins the bottom of the cover or is connected to it by a cement/sealing bead 36, a solar film or a sealing strip. As shown in FIGS. 3 & 4, the outside edge area 46 of the bead 32 is completely surrounded by the foam mass 18 which attaches the inside cover sheet 16 to the cover 10.

In the merging area 24, with a center line indicated by reference number 38, the foaming tool is made such that the structure or boundary of the foam mass 18 which is shown in FIGS. 3 & 4 is formed in the merging area 24. The ventilation direction of the foaming tool is indicated by the arrow 40. Basically, the foaming tool is made such that, in the merging area 24, the foaming cross section on the side opposite the ventilation side 40 is reduced relative to the corresponding part of the areas 42 which border the merging area 24. Here, the "foaming cross section" is defined as the distance of the end of the foam mass from the peripherally foamed surface or the surface covered with the foam mass (this applies to the direction perpendicular to the plane of the cover) or the distance between the respective ends of the foam mass (this applies to the transverse direction, i.e., the direction which is located in the cover plane and which is perpendicular to the peripheral direction).

In the embodiment shown in FIGS. 3 & 4, the foaming cross section diminishes, proceeding from the edge 54 of the merging area 24 to the middle 38 of the merging area 24, on the one hand, in the direction perpendicular to the plane of the cover, and on the other hand, moreover, also in the direction transverse thereto, by which a recess area 44 is formed. According to FIG. 3, in the area 44, the lower boundary of the foam mass 18 is gradually lowered towards the center line 38, so that the covering of the bead edge 46 towards the center line 38 becomes thinner. Furthermore, the boundary of the foam mass of the recessed area 44 in the direction transverse to the center line 38 is pushed outward in the ventilation direction so that the area of the bead edge 46 which is covered with a thick layer of foam mass becomes narrower towards the center line 38. In a plan view, this boundary line of the foam mass which runs in the peripheral direction is made S-shaped. The reduction in the foam cross section shown in the merging area 24 with the formation of the recessed area 44 results in that, in the peripheral foaming process, the flow rates of the flow fronts of the foam mass in the transverse direction, i.e., in the ventilation direction 40, are made more uniform, reducing the danger of air inclusions and eliminating, so to speak, the area 30 shown in FIG. 2 which is subject to bubble formation. This effect is achieved by the corresponding geometrical configuration of the foaming tool which leads to the shaping of the foam mass 18 shown in FIGS. 3 & 4.

Figure 2:
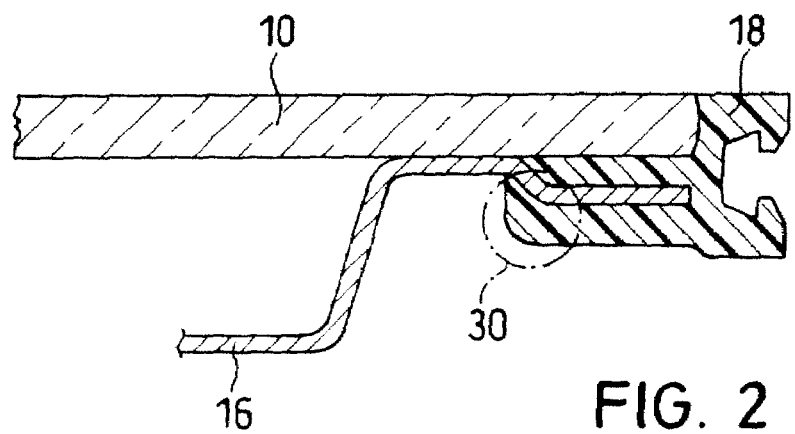
FIG. 2 is a sectional view along line II-II in FIG. 1.
Figure 5:
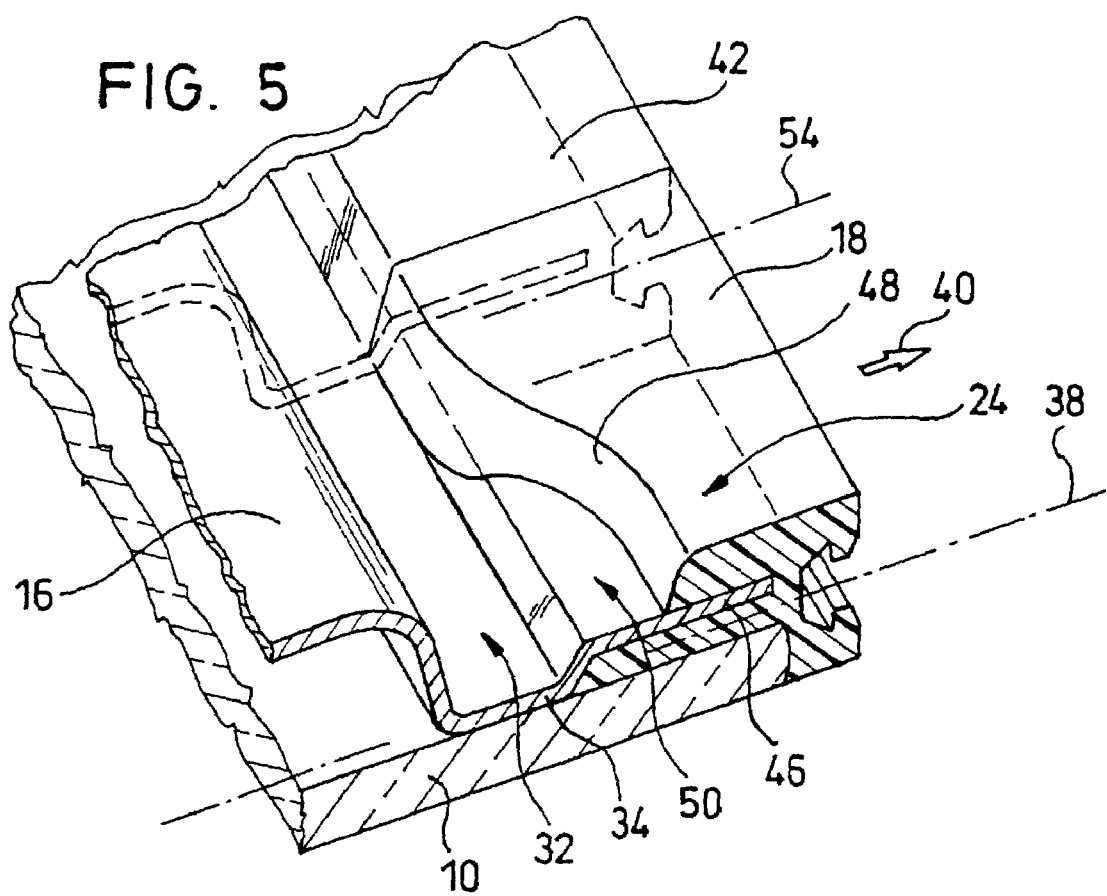
FIGS. 5 & 6 are views corresponding to those of FIGS. 3 & 4, but of a cover produced by a second embodiment of the process in accordance with the invention.
Figure 6:
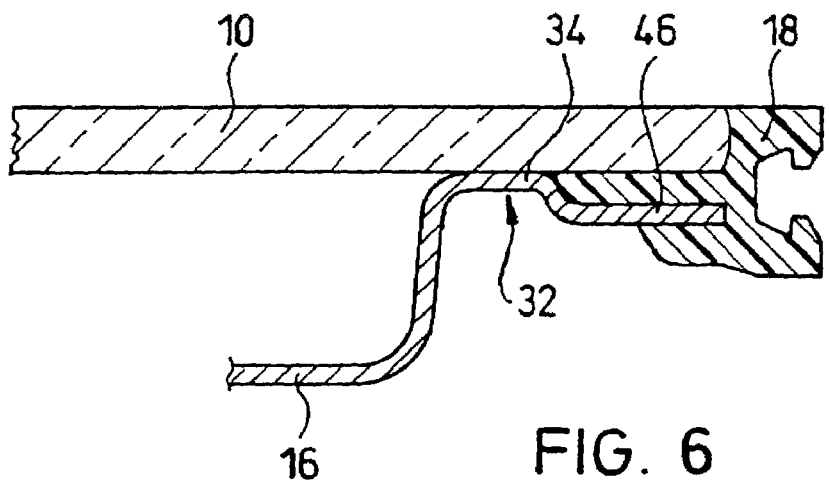

The embodiment shown in FIGS. 5 & 6 differs from the embodiment as shown in FIGS. 3 & 4 essentially in that the recess, in the direction perpendicular to the plane of the cover, is made so deep that the area 50 of the bead edge 46 remains uncovered by the foam mass 18. This shape is achieved in that the inner boundary 48 of the foam mass which runs in the peripheral direction is drawn in the ventilation direction 40 towards the center line 38 so strongly to the outside that the boundary line 48 is finally raised to the bead edge area 46. In this case, the area 30 which is subject to bubble formation from FIG. 2 is left completely open.

Figure 7:
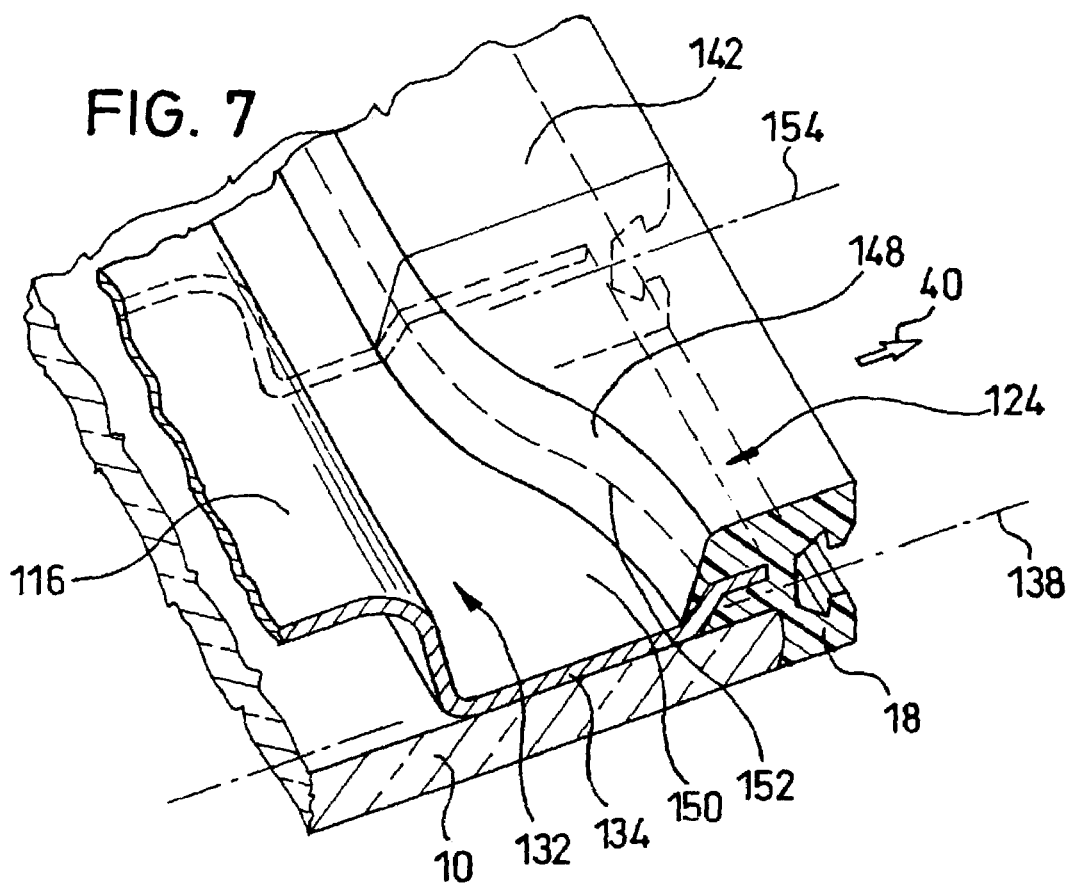
FIGS. 7 & 8 are views corresponding to those of FIGS. 3 & 4, but of a cover produced by a third embodiment of the process of the invention.
Figure 8:
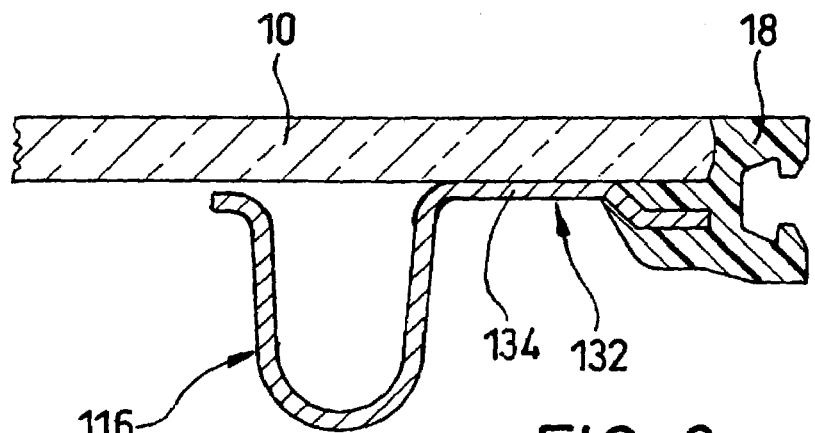

In the embodiments shown in FIGS. 7 & 8, for reducing the danger of bubble formation, not only does the foaming tool cooperate, but also the configuration of the inside cover sheet 116 itself does so. In this case the bead 132 is not made straight, as in the preceding embodiments, but it widens from the edge 154 of the merging area 124 facing the bordering area 142 towards the center line 138 of the area 124 in the direction to the ventilation side 40, in a plan view an S-shaped configuration of the outer boundary line 152 of the bead bottom 134 arising. The foaming tool is made such that the foaming cross section decreases from the edge 154 of the merging area 124 towards its center line 138 in the ventilation direction 40, i.e., the area covered with the foam mass 18 becomes narrower and narrower, the line of the inner boundary 148 of the foam mass following essentially the line of the boundary 152 of the bead bottom. In this way, in the merging area 124, a part 150 of the bead bottom 134 remains uncovered by the foam mass 18. The boundary 148 of the foam mass is made essentially S-shaped in a plan view. Here, like in the preceding embodiment, the area 30 which is subject to bubble formation is essentially completely eliminated or left open.

While various embodiments in accordance with the present invention have been shown and described, it is understood that the invention is not limited thereto. These embodiments may be changed, modified and further applied by those skilled in the art.

Therefore, this invention is not limited to the details shown and described previously but also includes all such changes and modifications which are encompassed by the appended claims.

What is claimed is:

1. Process for foaming around a peripheral edge area of a cover for a motor vehicle roof, comprising the steps of:
   placing the cover on or in a foaming tool, and
   feeding a single foam mass into the foaming tool such that two foam mass fronts are formed from the single mass which run around the peripheral edge area of the cover in opposite circumferential directions and merge with one another in a merging area at an opposite side of the cover from that at which the foam mass was fed into the foaming tool, said opposite side of the foaming tool being provided with a vent in the merging area,
   wherein, for preventing inclusion of gas bubbles into the foam mass within the merging area, a foaming cross section of the foaming tool is reduced in the merging area at a side of the foaming tool which is opposite the vented side of the foaming tool relative to a foaming cross section of areas which border the merging area, the reduction in the foaming cross section being produced in a gradual manner at both ends of the merging area and being in a direction toward the vent of the foaming tool.

2. Process as claimed in claim 1, wherein the foaming cross section in the merging area is diminished in circumferential directions of foam flow from edges of the merging area towards a center of the merging area such that the foam mass fronts are pushed toward the ventilation side of the foaming tool.

3. Process as claimed in claim 2, wherein in the foaming cross section is reduced in a manner causing an area to remain without foam mass covering by the reduction in the foaming cross section.

4. Process as claimed in claim 2, wherein the foaming cross section in the merging area also is diminished in a direction which is perpendicular to a plane the cover is located and said circumferential directions of foam flow.

5. Process as claimed in claim 2, wherein a foam mass boundary is formed running in the peripheral direction between the edge of the merging area and center line of the merging area that is S-shaped in a plan view.

6. Process as claimed in claim 1, wherein the foaming tool is used which is mirror-symmetrical with reference to a center plane of the merging area.

7. Process as claimed in claim 1, wherein a carrier element is attached to the cover by means of the peripheral foaming.

8. Process as claimed in claim 7, wherein an edge area of the carrier element has a bead which runs in the peripheral direction, the bead having a base which faces the bottom of the cover.

9. Process as claimed in claim 8, wherein an outside edge of the bead, on a side facing away from the cover, is covered essentially completely by the foam mass outside the merging area, while within the merging area the outside edge remains partially uncovered by the foam mass.

10. Process as claimed in claim 8, wherein the bead widens towards the center of the merging area in a direction towards the ventilation side of the foaming tool.

11. Process as claimed in claim 10, wherein the foaming tool is made such that the outside edge of the bead is covered by the foam mass within the merging area, a foam mass cover boundary of the bead bottom following essentially the widening of the bead bottom in the peripheral direction.

12. Process as claimed in claim 7, wherein the carrier element is a sheet metal section.

13. Process as claimed in claim 1, wherein the ventilation side of the foaming tool faces outward from the periphery of the cover.

14. Process as claimed in claim 1, wherein a glass pane is used for the cover.

15. Process as claimed in claim 1, wherein the foam mass is mad of PUR.

* * * * *